(12) United States Patent
Okada et al.

(10) Patent No.: US 11,893,559 B2
(45) Date of Patent: Feb. 6, 2024

(54) UNIT MOUNTING STRUCTURE AND ELECTRONIC APPARATUS

(71) Applicant: NEC Platforms, Ltd., Kawasaki (JP)

(72) Inventors: Masahiro Okada, Kanagawa (JP); Tetsuya Tanabe, Kanagawa (JP)

(73) Assignee: NEC Platforms, Ltd., Kawasaki (JP)

( * ) Notice: Subject to any disclaimer, the term of this patent is extended or adjusted under 35 U.S.C. 154(b) by 248 days.

(21) Appl. No.: 17/428,163

(22) PCT Filed: Jan. 14, 2020

(86) PCT No.: PCT/JP2020/000789
§ 371 (c)(1),
(2) Date: Aug. 3, 2021

(87) PCT Pub. No.: WO2020/162107
PCT Pub. Date: Aug. 13, 2020

(65) Prior Publication Data
US 2022/0092569 A1  Mar. 24, 2022

(30) Foreign Application Priority Data

Feb. 8, 2019 (JP) ................................ 2019-021200

(51) Int. Cl.
*G06Q 20/20* (2012.01)
*G06F 1/18* (2006.01)
*H05K 5/02* (2006.01)

(52) U.S. Cl.
CPC ............. *G06Q 20/20* (2013.01); *G06F 1/181* (2013.01); *H05K 5/0217* (2013.01)

(58) Field of Classification Search
CPC ............................. G06F 1/181; H05K 5/0217
See application file for complete search history.

(56) References Cited

U.S. PATENT DOCUMENTS

| 5,608,603 | A | * | 3/1997 | Su ........................ H01H 13/702 361/679.08 |
| 6,061,234 | A | * | 5/2000 | Broder ................. H05K 5/0013 361/679.41 |

(Continued)

FOREIGN PATENT DOCUMENTS

| JP | S57-022289 U | 2/1982 |
| JP | H01-139487 U | 9/1989 |

(Continued)

OTHER PUBLICATIONS

International Search Report for PCT Application No. PCT/JP2020/000789, dated Mar. 31, 2020.

(Continued)

*Primary Examiner* — Rockshana D Chowdhury
*Assistant Examiner* — Douglas R Burtner
(74) *Attorney, Agent, or Firm* — Sughrue Mion, PLLC

(57) ABSTRACT

A unit has a bottom surface, and first and second flange portions. A mounting plate has a first hook portion to be engaged with the first flange portion to control movement of the unit, having been mounted onto an upper plate surface, toward a front side in a depth direction and in a height direction; a second hook portion to be engaged with the second flange portion to control movement of the unit, having been mounted onto the upper plate surface, toward the front side in the depth direction and in the height direction; and a locking portion releasably engaged with the second flange portion to allow movement of the unit, being inserted or removed on the upper plate surface in the depth direction, and to control movement of the unit, having been mounted onto the upper plate surface, toward a rear side in the depth direction.

20 Claims, 12 Drawing Sheets

(56) References Cited

U.S. PATENT DOCUMENTS

| | | | | |
|---|---|---|---|---|
| 7,208,686 | B1* | 4/2007 | Chen | G06F 1/181 174/559 |
| 7,448,702 | B2* | 11/2008 | Chen | G06F 1/181 312/265.6 |
| 7,598,834 | B2* | 10/2009 | Whitaker | H01H 71/0228 335/132 |
| 10,353,437 | B1* | 7/2019 | Kitamura | G06F 1/1669 |
| 2007/0217137 | A1* | 9/2007 | Chen | H05K 5/03 361/807 |
| 2008/0285216 | A1* | 11/2008 | Kobayashi | G06F 1/1616 361/679.08 |
| 2009/0086448 | A1* | 4/2009 | Hiew | H05K 5/026 361/753 |
| 2011/0157779 | A1* | 6/2011 | Chang | H05K 5/0221 361/679.01 |
| 2012/0325993 | A1* | 12/2012 | Lu | G06F 1/181 248/221.11 |
| 2014/0168868 | A1* | 6/2014 | Hsiao | G06F 1/181 361/679.01 |
| 2016/0139637 | A1* | 5/2016 | Doi | G06F 1/1684 24/592.1 |
| 2019/0389691 | A1* | 12/2019 | Stranieri | B66B 1/3469 |
| 2022/0159863 | A1* | 5/2022 | Wu | H05K 7/1487 |
| 2023/0213986 | A1* | 7/2023 | Liu | H05K 5/0221 361/679.34 |

FOREIGN PATENT DOCUMENTS

| | | |
|---|---|---|
| JP | H02-127075 U | 10/1990 |
| JP | H02-305496 A | 12/1990 |
| JP | H05-048274 A | 2/1993 |
| JP | 2004-273720 A | 9/2004 |
| JP | 2012-167706 A | 9/2012 |
| WO | 2017/219646 A1 | 12/2017 |

OTHER PUBLICATIONS

English translation of Written opinion for PCT Application No. PCT/JP2020/000789, dated Mar. 31, 2020.
Japanese Notice of Allowance for JP Application No. 2019-021200 dated Aug. 12, 2020 with English Translation.

* cited by examiner

UNIT MOUNTING STRUCTURE AND ELECTRONIC APPARATUS

This application is a National Stage Entry of PCT/JP2020/000789 filed on Jan. 14, 2020, which claims priority from Japanese Patent Application 2019-021200 filed on Feb. 8, 2019, the contents of all of which are incorporated herein by reference, in their entirety.

TECHNICAL FIELD

The present invention relates to a unit mounting structure and an electronic apparatus.

BACKGROUND ART

For example, an electronic apparatus such as a POS (Point Of Sale) terminal used in a POS system has a unit mounting structure in which a unit, such as a printer unit, that is a unit-like device performing an electric operation, is removably mounted to a mounting plate provided in the electronic apparatus.

Patent Literature 1 discloses a housing fixing structure. In the housing fixing structure disclosed in Patent Literature 1, an apparatus housing is fixed to a fixture by screwing.

PRIOR ART DOCUMENT

Patent Literature

Patent Literature 1: JP H01-139487 U

SUMMARY OF THE INVENTION

Like the housing fixing structure disclosed in Patent Literature 1, a structure in which a unit is removably mounted to a mounting plate by screwing requires attachment and detachment operations using a screw or a tool. Therefore, it is considered that there is a room for improvement in workability.

The present invention has been made in view of the above-mentioned circumstance. It is an object of the present invention to provide a unit mounting structure which allows a unit to be attached and detached without using a screw or a tool.

Another object of the present invention is to provide an electronic apparatus having a unit mounting structure as described above.

Means for Solving the Problem

According to the present invention, there is provided a unit mounting structure in which a unit is mounted to a mounting plate, the mounting plate being a plate body which has an upper plate surface extending in a depth direction and a width direction and which has a thickness along a height direction, the unit being a unit-like device extending in the width direction, the depth direction, and the height direction, the unit being mounted on the mounting plate to be removable along the depth direction on the upper plate surface, the unit after completion of mounting being fixed to the upper plate surface, wherein the unit has a bottom surface extending in the depth direction and the width direction; a first flange portion extending from one side of the bottom surface, that faces a front side in the depth direction, and extending toward the front side in the depth direction; and a second flange portion comprising a pair of flange pieces which extend from both sides of the bottom surface in the width direction, that face a rear side in the depth direction, and which extend toward outsides in the width direction, respectively, and toward the rear side in the depth direction; and wherein the mounting plate has a first hook portion formed on the upper plate surface and adapted to be engaged with the first flange portion inserted therein so as to control the movement of the unit, which has been mounted on the upper plate surface, toward the front side in the depth direction and in the height direction; a second hook portion composed of a pair of second hook pieces which are formed on the upper plate surface with a facing distance corresponding to that of the pair of flange pieces of the second flange portion and which is adapted to be engaged with the pair of flange pieces of the second flange portion inserted therein so as to control the movement of the unit, which has been mounted on the upper plate surface, toward the front side in the depth direction and in the height direction; and a locking portion including a pair of locking pieces which are attached to the plate body and which are adapted to be releasably engaged with the second flange portion so as to allow movement of the unit in the depth direction during insertion and removal in the depth direction on the upper plate surface, and to control movement of the unit, which has been mounted on the upper plate surface, toward the rear side in the depth direction.

According to the present invention, there is also provided an electronic apparatus comprising the mounting plate, the unit, and the unit mounting structure mentioned above, wherein the unit is a device which performs an electric operation.

Effect of the Invention

The unit mounting structure according to the present invention enables the unit to be attached and detached without using a screw or a tool.

BRIEF DESCRIPTION OF THE DRAWINGS

FIG. 5A is a perspective view in the middle of insertion of the unit with respect to a mounting plate; FIG. 5B is a partial perspective view in the middle of insertion of the unit with respect to the mounting plate; and FIG. 5C is a partial perspective view in a state where mounting of the unit with respect to the mounting plate is completed;

MODE FOR CARRYING OUT THE INVENTION

Hereinafter, embodiments of a unit mounting structure and an electronic apparatus according to the present invention will be described with reference to the drawings.

In the present embodiments, a mounting plate mounted to a housing frame of a POS terminal device as an electronic apparatus will be described as an example of a mounting plate. As a unit, a printer unit removably mounted to the mounting plate of the POS terminal device will be described as an example.

In the figures, only the mounting plate is shown as a main body of the POS terminal device as the electronic apparatus. In the figures, arrows labeled W, H, and D represent a width direction W including a leftward direction (left side) Wl and a rightward direction (right side) Wr of the unit mounting structure according to the present embodiments, a height direction H including a downward direction (lower side) Hl and an upward direction (upper side) Hu, and a depth direction D including a frontward direction (front side) Df, and a rearward direction (rear side) Dr, respectively.

First Embodiment

Referring to FIGS. 1A-5C, 8, 11A 11B and 12, in a unit mounting structure according to a first embodiment of the present invention, a unit (printer unit) 20 is removably mounted to a mounting plate 10 attached to a housing frame of a POS terminal device.

The mounting plate 10 is a plate body which is made of a stainless steel plate or a galvanized steel plate, which has an upper plate surface 11 extending in a depth direction D and a width direction W, and which has a thickness along a height direction H. The unit 20 has a unit-like shape extending along the width direction W, the depth direction D, and the height direction H. More specifically, in this unit mounting structure, the unit 20 is mounted to the mounting plate 10 so as to be pulled out along the depth direction D on the upper plate surface 11, and the unit 20 after completion of mounting is fixed to the upper plate surface 11. The mounting plate 10 has a rectangular shape, but may not have a rectangular shape.

Figure 1A:
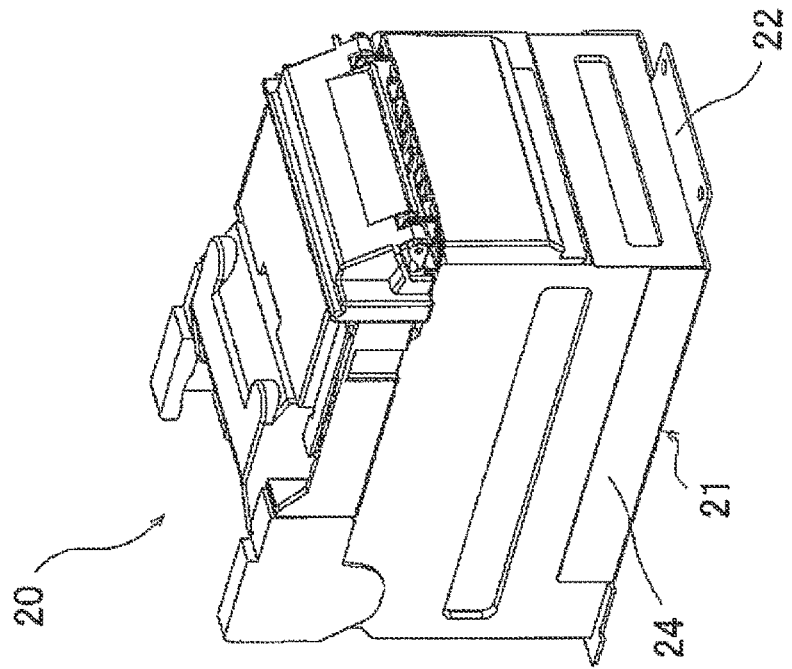
FIGS. 1A and 1B are perspective views of a unit in a unit mounting structure according to the present invention.
Figure 1B:
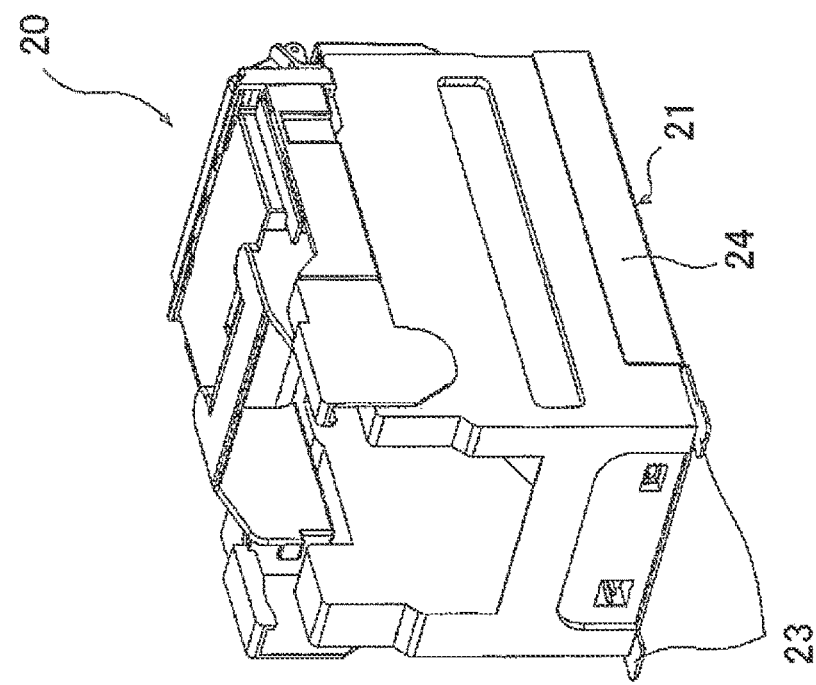

As shown in FIGS. 1A and 1B, the unit 20 has a bottom surface 21 extending in the depth direction D and the width direction W, a first flange portion 22, a second flange portion 23, and both side surfaces (right and left side surfaces) 24 in the width direction W. The bottom surface 21 of the unit 20 has a substantially rectangular shape.

The first flange portion 22 extends from one side of the bottom surface 21, that faces a front side Df in the depth direction D, and extends toward the front side Df in the depth direction D.

The second flange portion 23 comprises a pair of flange pieces which extend from both sides of the bottom surface 21 in the width direction W, that face a rear side Dr in the depth direction D, and which extend toward outsides in the width direction W, respectively, and toward the rear side Dr in the depth direction D.

Figure 11B:
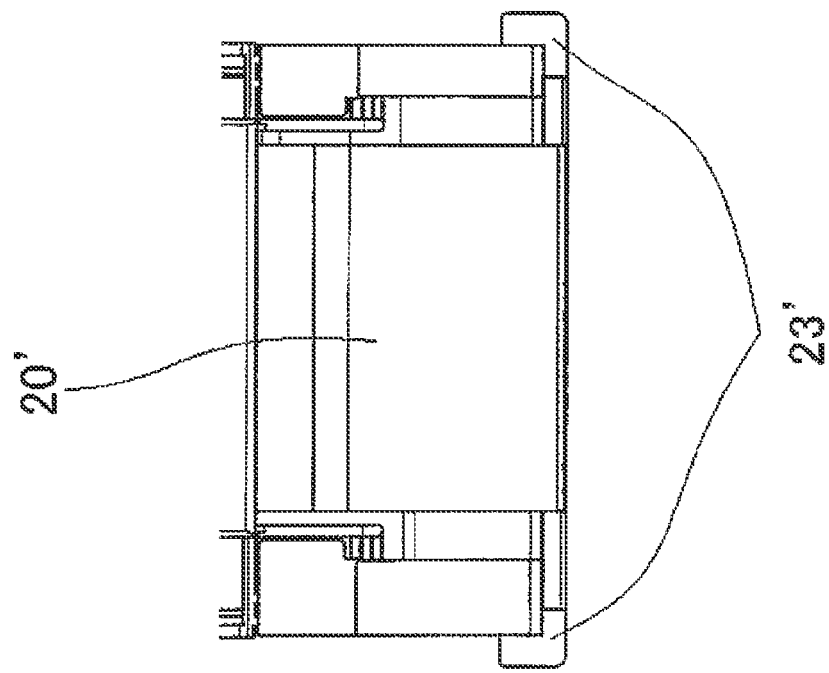
FIG. 11B is a partial top view of a unit in a unit mounting structure according to a modification of the first or the second embodiment of the present invention.
Figure 11A:
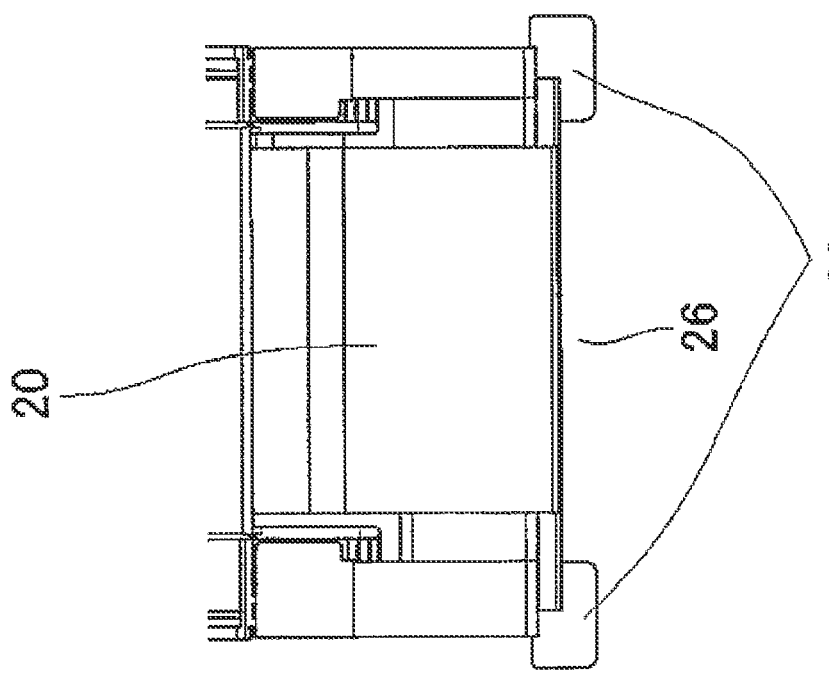
FIG. 11A is a partial top view of the unit in the unit mounting structure according to the first or the second embodiment of the present invention.

In the present invention, the second flange portion may be a second flange portion 23' or the like provided in a unit 20' at a position shown in FIG. 11B instead of the second flange portion 23 provided in the unit 20 at a position shown in FIG. 11A.

Figure 12:
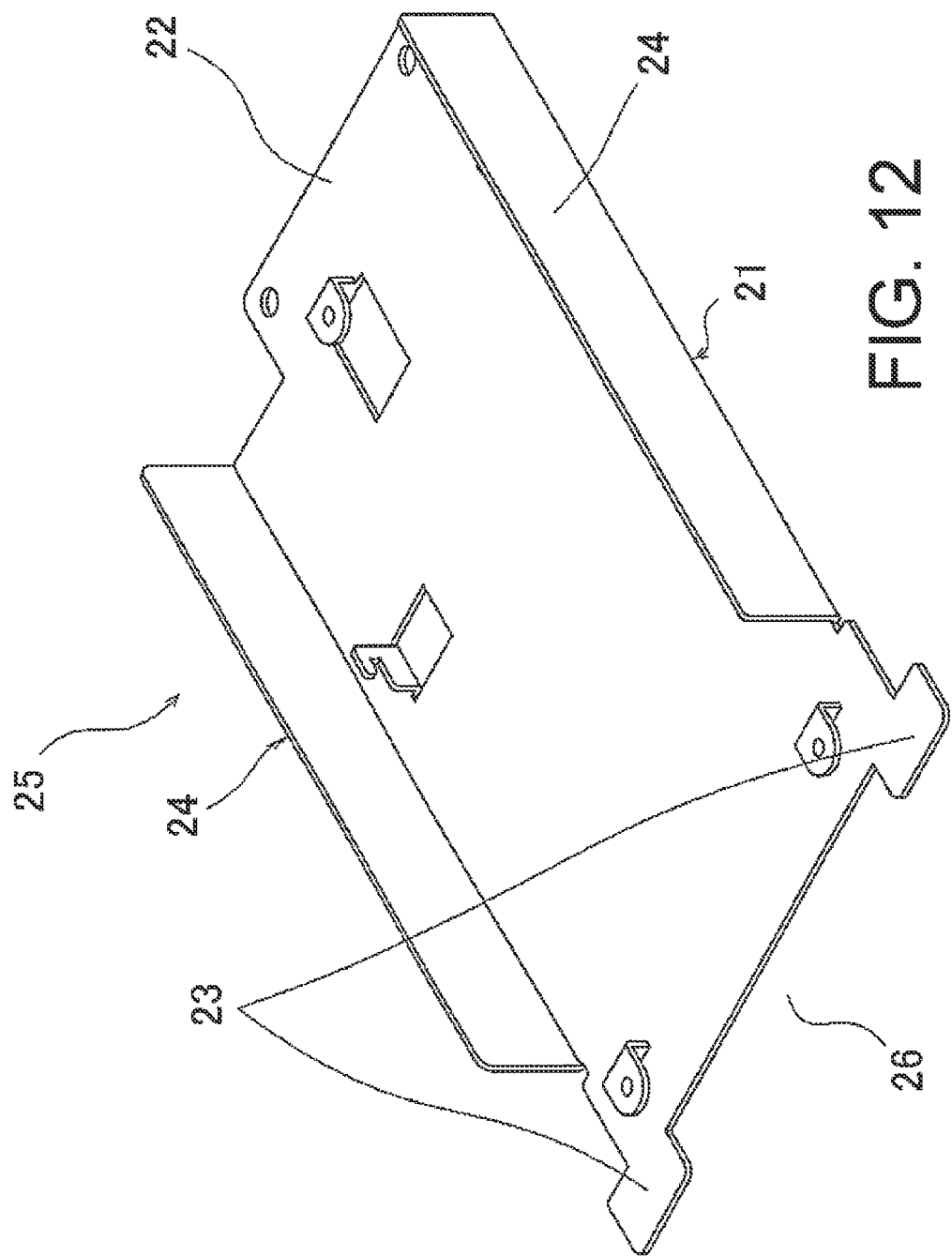
FIG. 12 is a perspective view of a lower case of the unit in the unit mounting structure according to the first or the second embodiment of the present invention.

More specifically, the unit 20 has a lower case 25 shown in FIG. 12 and made of a stainless steel plate or a galvanized steel plate. The bottom surface 21, the first flange portion 22, and the second flange portion 23 are formed integrally with the lower case 25 by sheet metal processing. In FIG. 12, a reference numeral 26 denotes a cut-out portion for preventing the bottom of the unit 20 from interfering with a leaf spring as a locking portion which will later be described. In the present invention, the bottom surface of the unit, the first flange portion, and the second flange portion may not be provided at the lower case forming a part of the housing of the unit, as in the present embodiment, but may be provided at a plate body fixed to the bottom surface of a housing of the unit as a separate member.

Figure 2:
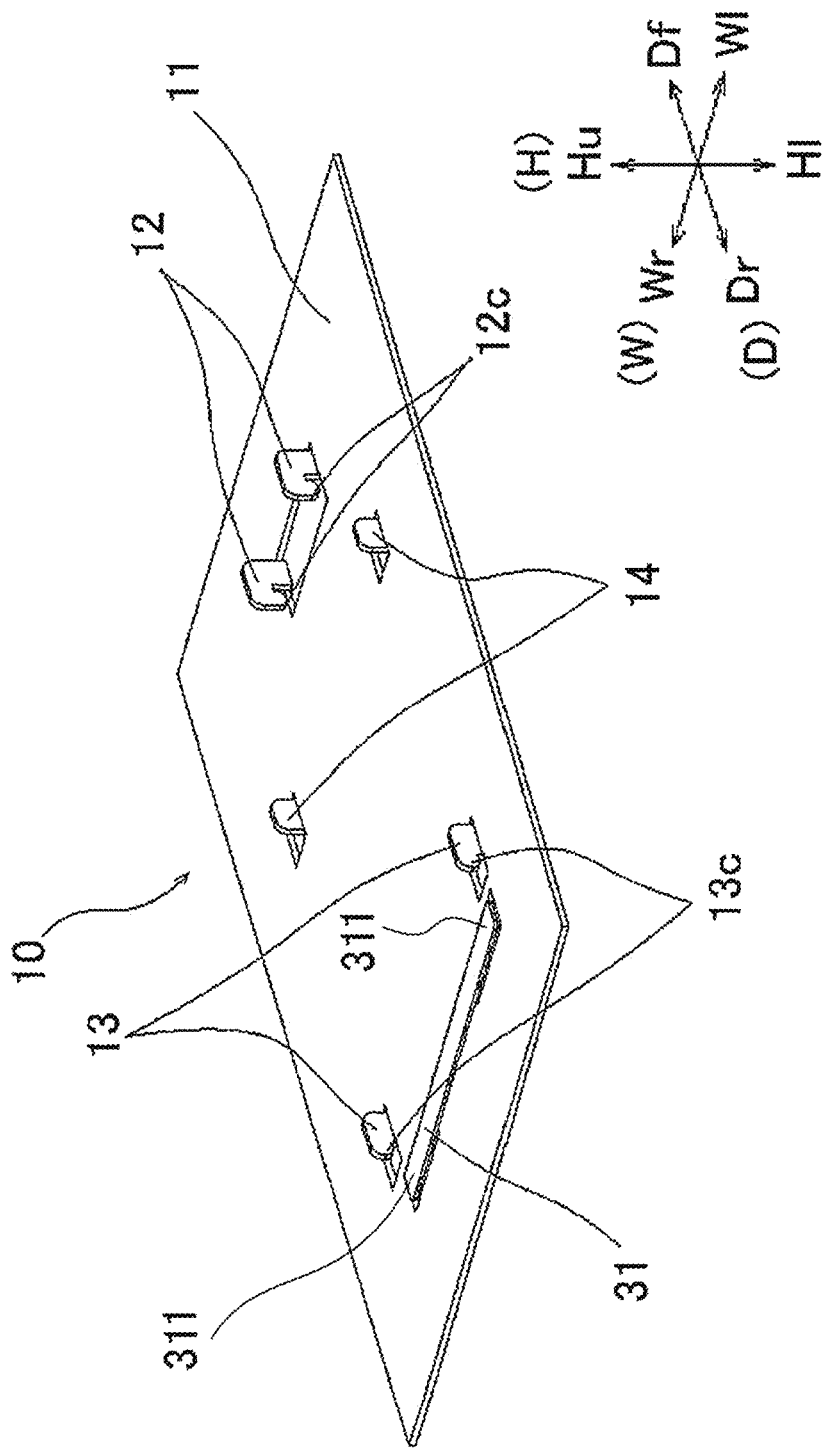
FIG. 2 is a perspective view of a mounting plate to which a unit mounting structure according to a first embodiment of the present invention is applied.
Figure 3:
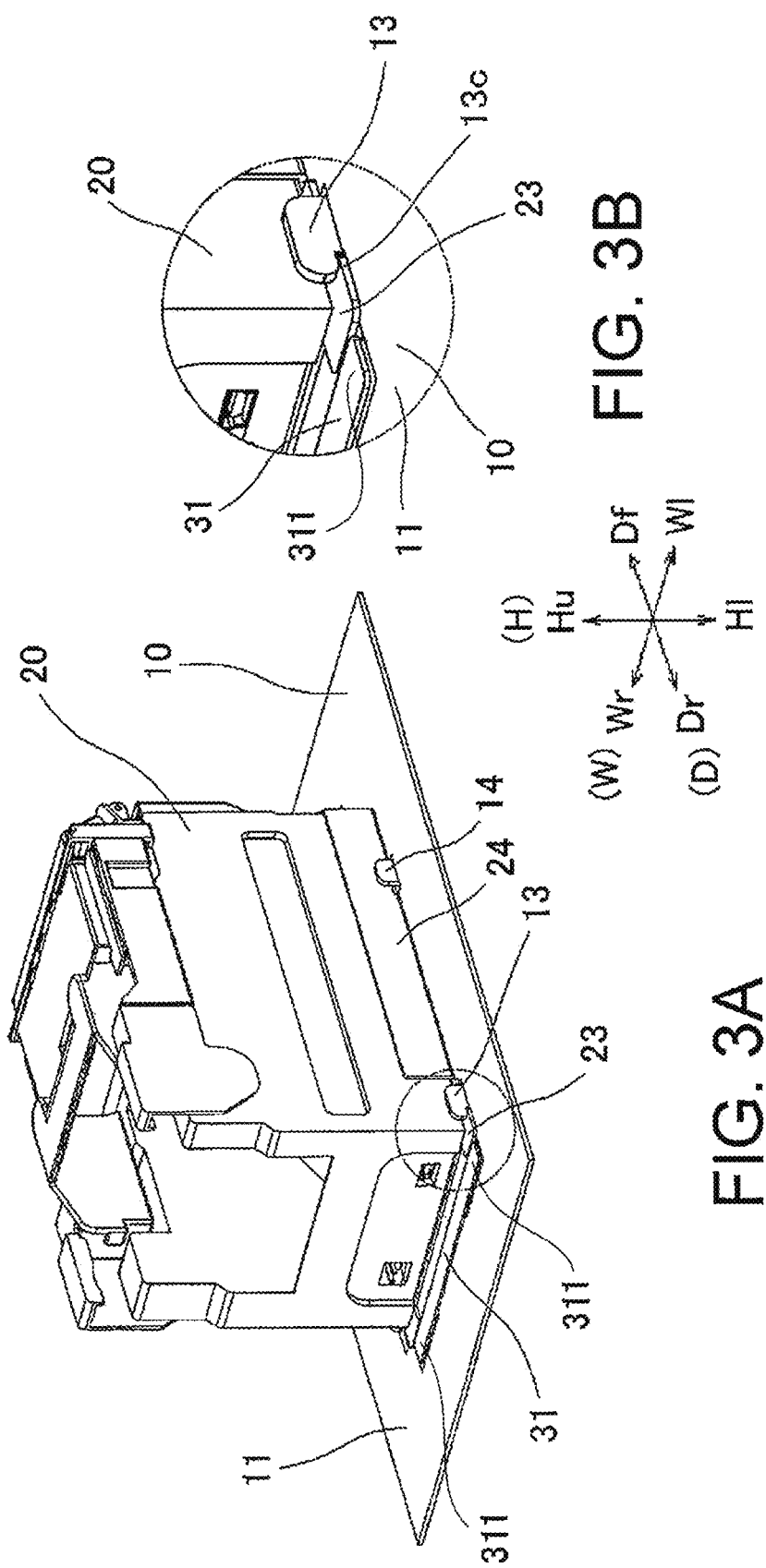
FIGS. 3A and 3B are a perspective view and (b) a partial perspective view of the unit mounting structure according to the first embodiment of the present; invention, respectively.
Figure 8:
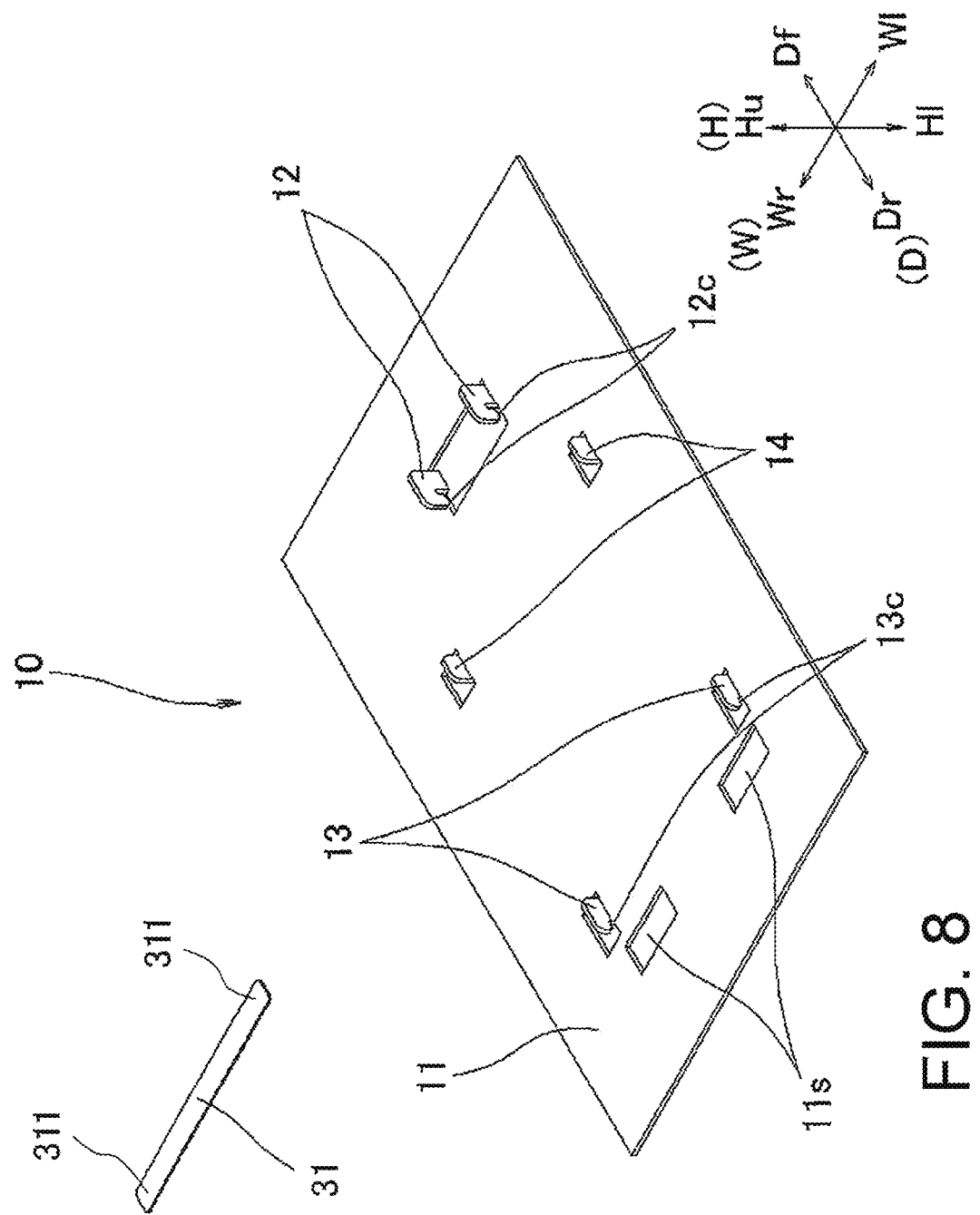
FIG. 8 is a perspective view of the mounting plate in the unit mounting structure according to the first embodiment of the present invention in a state where a leaf spring is removed.
Figure 9:
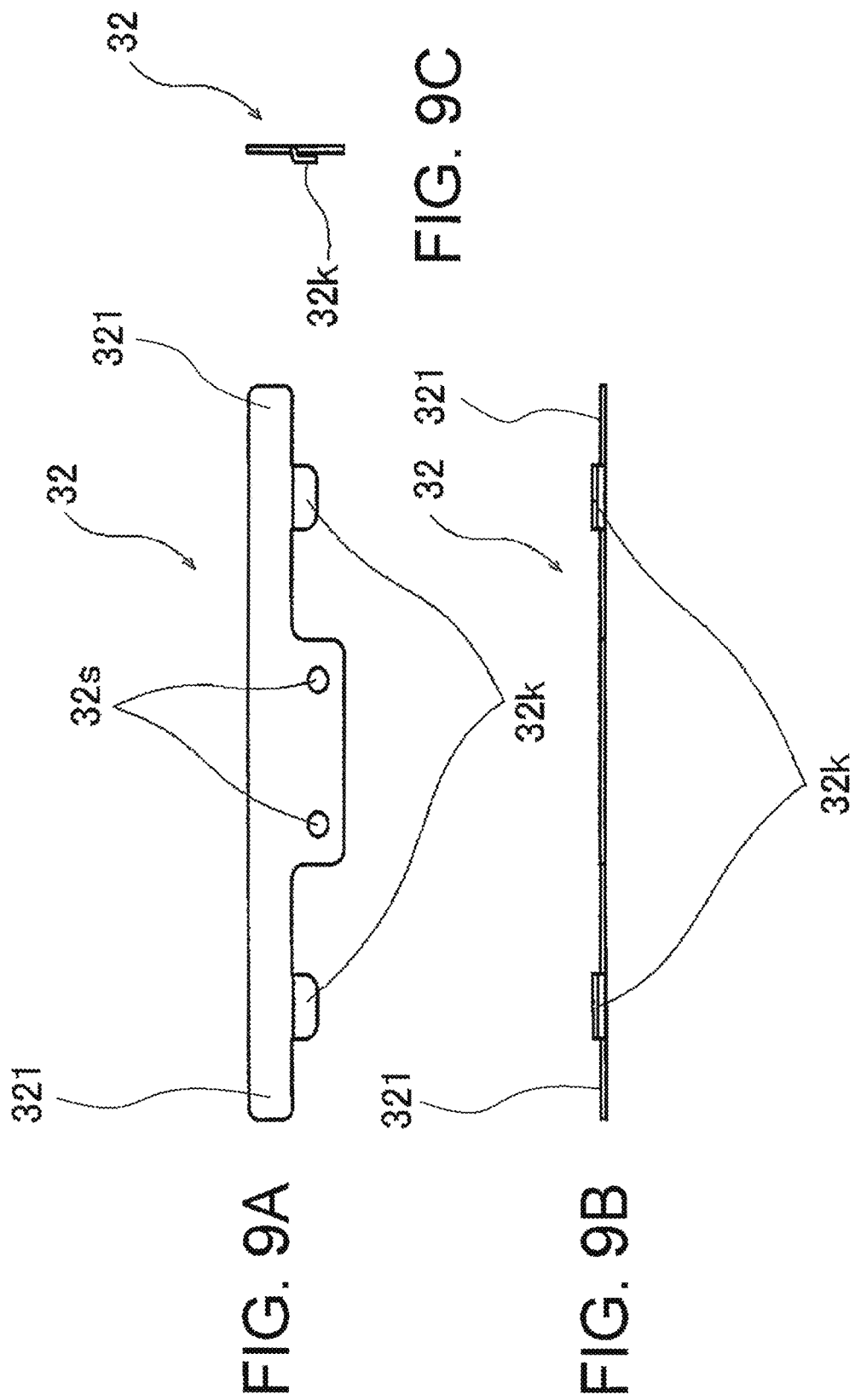
FIG. 9A, FIG. 9B, and FIG. 9C are a top view, a rear view, and a left side view of a leaf spring in the unit mounting structure according to the second embodiment of the present invention; invention, respectively.

As shown in FIGS. 2 and 8, the mounting plate 10 has the upper plate surface 11, a first hook portion 12, a second hook portion 13, a rib portion 14, and a locking portion 31. The upper plate surface 11, the first hook portion 12, the second hook portion 13, and the rib portion 14 are formed integrally with a main body (plate body) of the mounting plate 10 by sheet metal processing. The thickness of the mounting plate 10 is thicker than the thickness of a leaf spring 31 which will later be described.

Figure 4:
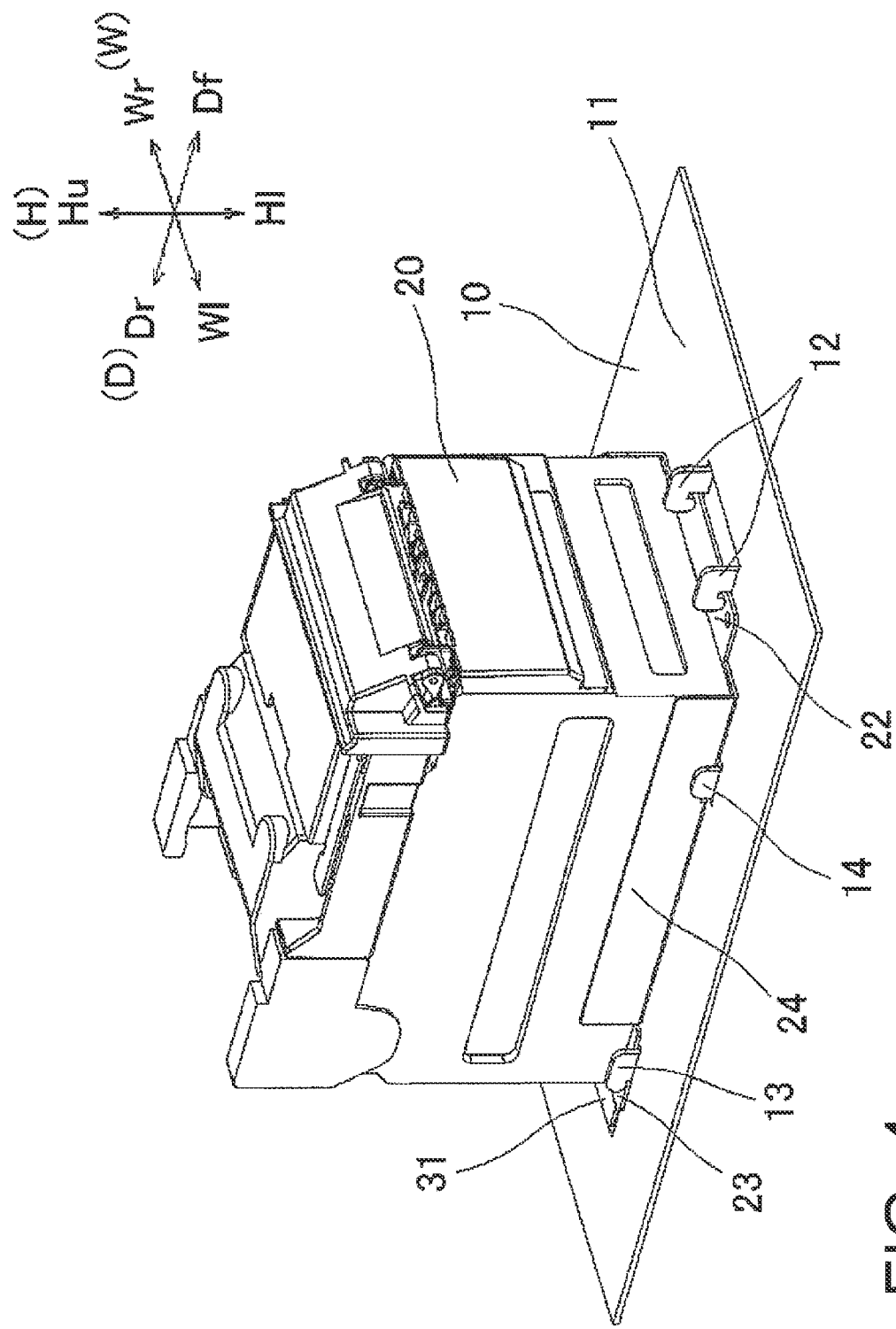
FIG. 4 is a perspective view of the unit mounting structure according to the first embodiment of the present invention.
Figure 5:
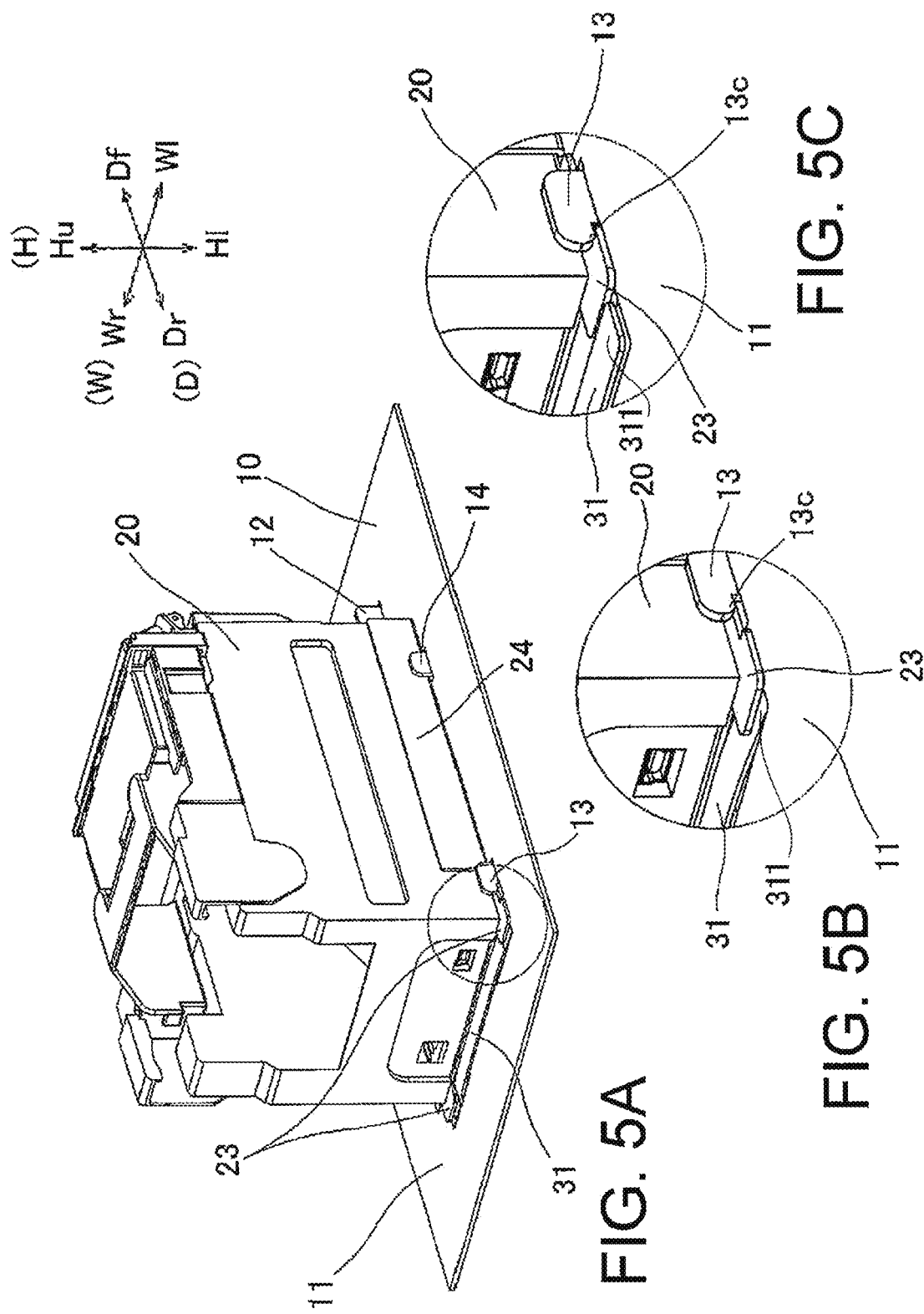
FIGS. 5A to 5C are perspective views of the unit mounting structure according to the first embodiment of the present invention.

The first hook portion 12 is composed of a pair of first hook pieces which are formed on the upper plate surface 11 with a facing distance corresponding to the size of the first flange portion 22 in the width direction W and which is adapted to be engaged with the first flange portion 22 inserted therein as shown in FIG. 4 so as to control the movement of the unit 20, which has been mounted on the upper plate surface 11, toward the front side Df in the depth direction D and in the height direction H. In the present invention, the first hook portion may not be composed of the pair of first hook pieces, but may be a single hook.

The second hook portion 13 is composed of a pair of second hook pieces which are formed on the upper plate surface 11 with a facing distance corresponding to that of the pair of flange pieces of the second flange portion 23 and which is adapted to be engaged with the pair of flange pieces of the second flange portion 23 inserted therein as shown in FIG. 3B and FIG. 5C so as to control the movement of the unit 20, which has been mounted on the upper plate surface 11, toward the front side Df in the depth direction D and in the height direction H.

More specifically, as shown in FIGS. 2 and 8, the first hook portion 12 opens toward the rear side Dr in the depth direction D at a gap height allowing entry of the first flange portion 22. Similarly, the pair of second hook pieces of the second hook portion 13 open toward the rear side Dr in the depth direction D at a gap height allowing entry of the pair of flange pieces of the second flange portion 23, respectively. Furthermore, the first hook portion 12 has chamfered portions 12c at its open end. Alternatively, rounded portions may be formed instead of the chamfered portions. Similarly, the pair of second hook pieces of the second hook portion 13 also have chamfered portions 13c at their respective open ends. In place of the chamfered portions, rounded portions may be formed.

The rib portion 14 is composed of a pair of rib pieces which are formed on the upper plate surface 11 with a facing distance corresponding to that of the both side surfaces (left and right side surfaces) 24 of the unit 20 in the width direction W, and which are adapted to be engaged with the both side surfaces 24 of the unit 20 in the width direction W, respectively, so as to control the movement of the unit 20 in the width direction W. Opposing surfaces of the pair of rib pieces of the rib portion 14 are parallel to each other.

The locking portion 31 includes a pair of locking pieces 311 which are attached to the main body (plate body) of the mounting plate 10 and which are adapted to be releasably engaged with the second flange portion 23 so as to allow movement of the unit 20 in the depth direction D during insertion and removal in the depth direction D on the upper plate surface 11, and to control movement of the unit 20, which has been mounted on the upper plate surface 11, toward the rear side Dr in the depth direction D.

The pair of locking pieces 311 of the locking portion 31 have elasticity, are mounted on the upper plate surface 11, and have a flat plate shape. The pair of locking pieces 311 of the locking portion 31 are configured to descend to a level not higher than that of the upper plate surface 11 when the locking pieces 311 are pressed by a pressing force exceeding a predetermined magnitude.

More specifically, as shown in FIGS. 2 and 8, the locking portion 31 is formed by a single leaf spring which extends in the width direction W and whose center portion in the width direction W is attached to the upper plate surface 11 by spot welding or the like. The locking portion 31 may be composed of two leaf springs of symmetrical shapes instead of the single leaf spring. The pair of locking pieces 311 are formed by both ends of the locking portion (leaf spring) 31 in the width direction W. In case where the locking portion is composed of two leaf springs, the pair of locking pieces 311 are formed by the two leaf springs, respectively. The upper plate surface 11 of the mounting plate 10 is provided with recesses (holes) 11s allowing the both ends of the leaf spring 31 to descend to the level not higher than that of the upper plate surface 11. The both ends of the leaf spring 31 are configured so as not to protrude from a lower plate surface of the mounting plate 10 toward a lower side Hl in the height direction H even when the both ends descend to the level not higher than that of the upper plate surface 11. The thickness of the second flange portion 23 is thicker than the thickness of the leaf spring 31.

Next, a method of mounting the unit to the mounting plate by using the unit mounting structure will be described.

First, the unit 20 is slid from the rear side Dr in the depth direction D of the mounting plate 10 toward the front side Df in the depth direction D so that an end of the first flange portion 22 is in contact with the upper plate surface 11 in an area between the locking portion (leaf spring) 31 and the first hook portion 12.

When the pair of flange pieces of the second flange portion 23 of the unit 20, which is slid toward the front side Df in the depth direction D, come onto the pair of locking pieces 311 of the leaf spring 31 as shown in FIGS. 5A and 5B, the pair of locking pieces 311 are pressed down by the pair of flange pieces toward the lower side Hl in the height direction H to descend to the level not higher than that of the upper plate surface 11. The pair of locking pieces 311 are pressed down by the weight of the unit 20. If the unit is light in weight and cannot press down the locking pieces 311, the unit may be applied with a force from above to press down the locking pieces 311.

The unit 20 is slid toward the front side Df in the depth direction D while the both side surfaces 24 of the unit 20 in the width direction W are controlled in movement in the width direction W by the rib portion 14.

In the unit 20 further slid toward the front side Df in the depth direction D, the first flange portion 22 is inserted into an opening portion of the first hook portion 12 of the mounting plate 10, and the pair of flange pieces of the second flange portion 23 are inserted into opening portions of the pair of second hook pieces of the second hook portion 13. Upon completion of insertion of the first flange portion 22 into the opening portion of the first hook portion 12 and insertion of the pair of flange pieces of the second flange portion 23 into the opening portions of the pair of second hook pieces of the second hook portion 13, mounting of the unit 20 on the mounting plate 10 is completed. At this time, the first flange portion 22 and the first hook portion 12 are engaged with each other, and the pair of flange pieces of the second flange portion 23 and the pair of second hook pieces of the second hook portion 13 are engaged with each other.

Further, when the mounting of the unit 20 to the mounting plate 10 is completed, that is, when the pair of flange pieces of the second flange portion 23 come to the front side Df in the depth direction D ahead of the pair of locking pieces 311 of the leaf spring 31, pressing down of the pair of locking pieces 311 by the pair of flange pieces is completed.. The pair of locking pieces 311 of the leaf spring 31 ascend by elasticity toward the upper side Hu in the height direction H to be engaged with an end edge of the second flange portion 23 which faces the rear side Dr in the depth direction D.

As a result, as shown in FIGS. 3A and 3B, FIG. 4 and FIG. 5C the unit 20 is controlled in movement toward the front side Df in the depth direction D and movement in the height direction H by the upper plate surface 11, the first hook portion 12, and the second hook portion 13 of the mounting plate 10. Further, as shown in FIG. 3A FIG. 4 and FIG. 5A the unit 20 is controlled by the rib portion 14 in movement in the width direction W. Further, as shown in FIGS. 3A and 3B, FIG. 4 and FIG. 5C the unit 20 is controlled by the locking portion (leaf spring) 31 in movement toward the rear side Dr in the depth direction D. Thus, the unit 20 is fixed to the mounting plate 10.

Next, a method of removing the unit from the mounting plate by using the unit mounting structure will be described.

First, as shown in FIGS. 3A and 3B, FIG. 4 and FIG. 5C, the pair of locking pieces 311 of the locking portion (leaf spring) 31 of the mounting plate 10 with the unit 20 fixed thereto is pressed down by an operator toward the lower side Hl in the height direction H to the level not higher than that of the upper plate surface 11. Thus, the engagement of the locking portion (leaf spring) 31 with the second flange portion 23 is released, and the unit 20 is slidable toward the rear side Dr in the depth direction D. When the unit 20 starts to be slid toward the rear side Dr in the depth direction D, the operator releases his/her hand from the locking portion 31. Thereafter, the locking portion (leaf spring) 31 is pressed down by the bottom surface 21 of the unit 20.

The unit 20 which is further slid toward the rear side Dr in the depth direction D is removed from the mounting plate 10.

According to the unit mounting structure of the first embodiment of the present invention, the unit can be attached and detached without using a screw or a tool. Further, the unit mounting structure can be reduced in height because nothing protrudes from the lower plate surface of the mounting plate toward the lower side in the height direction.

Second Embodiment

A second embodiment of the present invention is different in shape of the leaf spring as the locking portion from the first embodiment. Therefore, as regards configurations of the second embodiment, which are same as or similar to those of the first embodiment, the description of the first embodiment, including the drawings, will be incorporated and detailed description thereof will be omitted.

Referring to FIGS. 6, 7, 9A to 9C, and 10, in a unit mounting structure according to the second embodiment of the present invention, the unit (printer unit) 20 shown in FIGS. 1A and 1B is removably mounted to a mounting plate 15 attached to the housing frame of the POS terminal device in the manner similar to the first embodiment.

The mounting plate 15 is a plate body which is made of a stainless steel plate or a galvanized steel plate, which has an upper plate surface 16 extending in the depth direction D and the width direction W, and which has a thickness along the height direction H. The unit 20 has the unit-like shape extending along the width direction W, the depth direction D, and the height direction H. More specifically, in this unit mounting structure, the unit 20 is mounted to the mounting plate 15 so as to be pulled out along the depth direction D on the upper plate surface 16, and the unit 20 after completion of mounting is fixed to the upper plate surface 16. The mounting plate 15 has a rectangular shape, but may not have a rectangular shape.

The unit 20 has the bottom surface 21 extending in the depth direction D and the width direction W, the first flange portion 22, the second flange portion 23, and the both side surfaces (right and left side surfaces) 24 in the width direction W. The first flange portion 22 extends from one side of the bottom surface 21, that faces the front side Df in the depth direction D, and extends toward the front side Df in the depth direction D. The second flange portion 23 comprises the pair of flange pieces which extend from the both sides of the bottom surface 21 in the width direction W, that face the rear side Dr in the depth direction D, and which extend toward the outsides in the width direction W, respectively, and toward the rear side Dr in the depth direction D.

Figure 6:
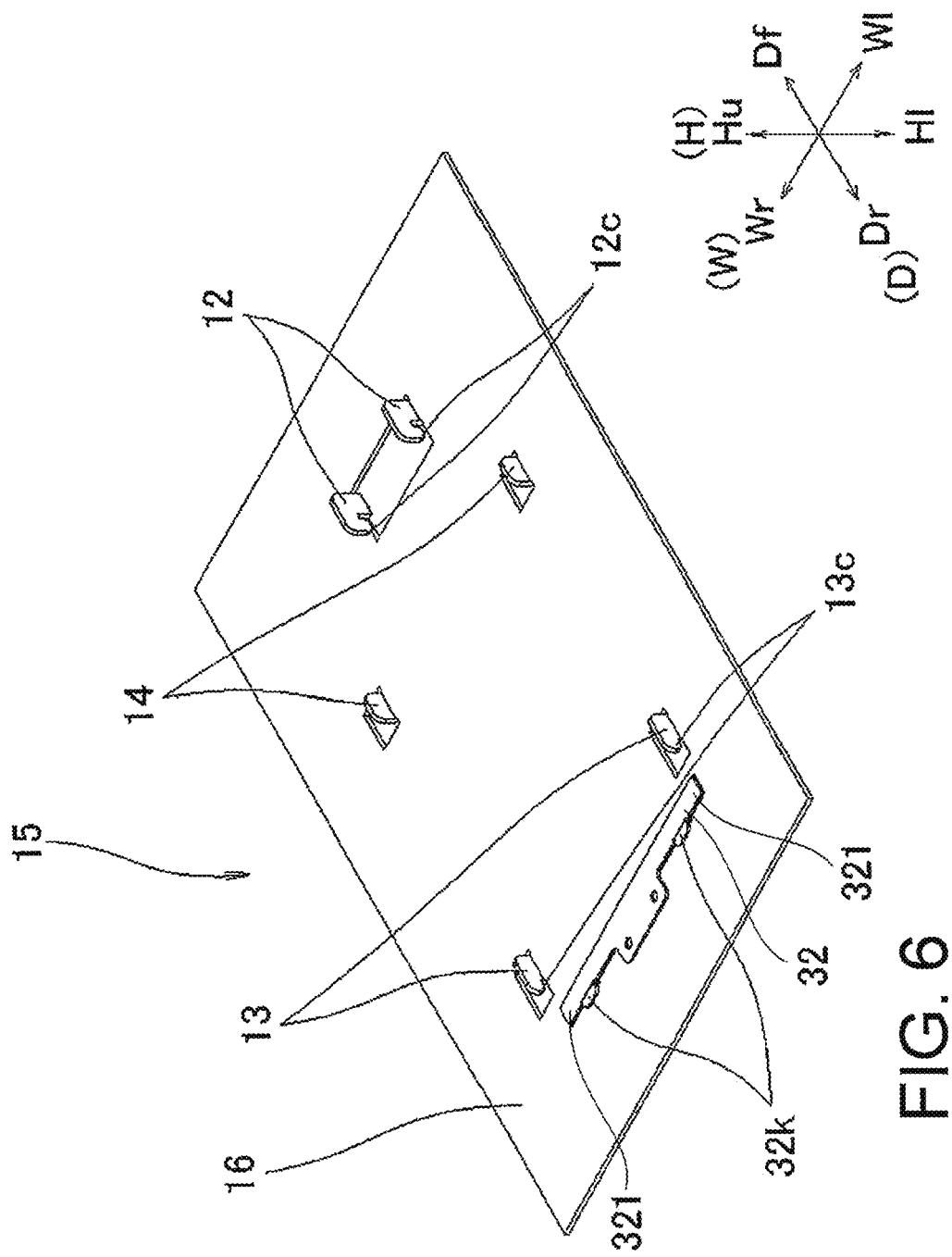
FIG. 6 is a perspective view of a mounting plate in a unit mounting structure according to a second embodiment of the present invention.
Figure 7:
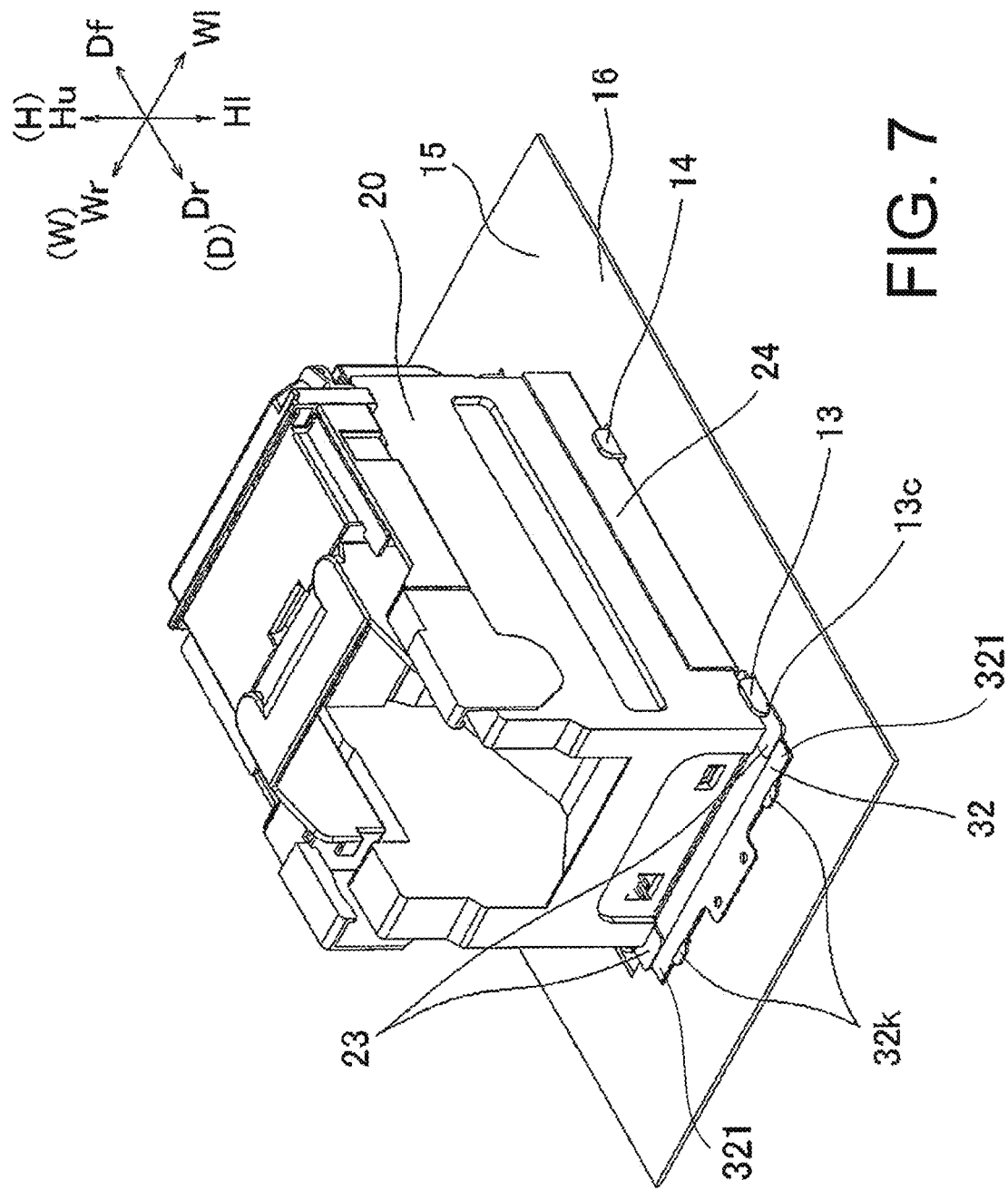
FIG. 7 is a perspective view of the unit mounting structure according to the second embodiment of the present invention.
Figure 10:
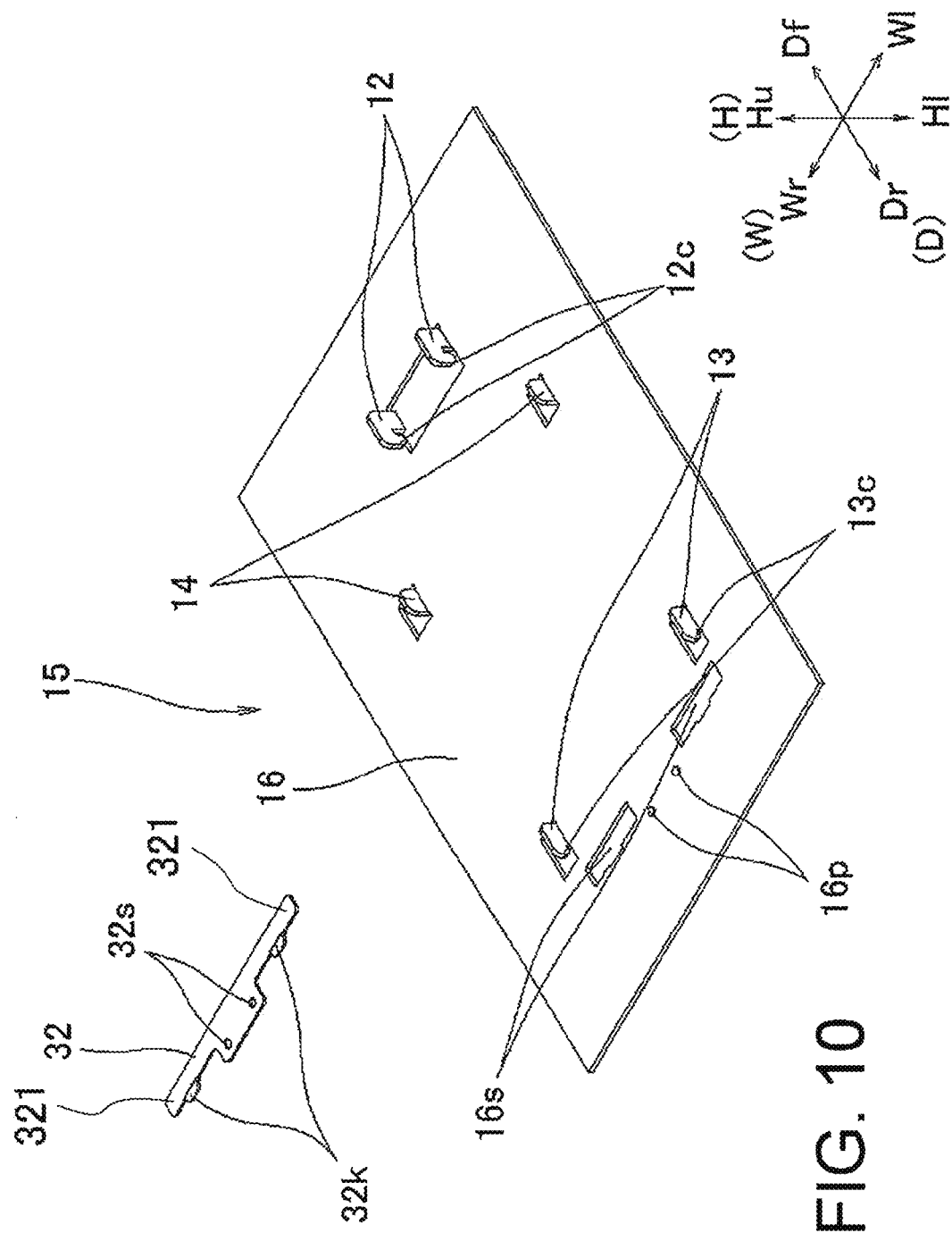
FIG. 10 is a perspective view of the mounting plate in the unit mounting structure according to the second embodiment of the present invention in a state where the leaf spring is removed.

As shown in FIGS. 6 and 10, the mounting plate 15 has the upper plate surface 16, the first hook portion 12, the second hook portion 13, the rib portion 14, and a locking portion (leaf spring) 32. The upper plate surface 16, the first hook portion 12, the second hook portion 13, and the rib portion 14 are formed integrally with a main body (plate body) of the mounting plate 15 by sheet metal processing. The thickness of the mounting plate 15 is thicker than the thickness of the leaf spring 32.

The first hook portion 12 is composed of the pair of first hook pieces which are formed on the upper plate surface 16 with the facing distance corresponding to the size of the first flange portion 22 in the width direction W and which is adapted to be engaged with the first flange portion 22 inserted therein as shown in FIG. 4 so as to control the movement of the unit 20, which has been mounted on the upper plate surface 16, toward the front side Df in the depth direction D and in the height direction H. In the present invention, the first hook portion may not be composed of the pair of first hook pieces, but may be a single hook. The second hook portion 13 is composed of the pair of second hook pieces which are formed on the upper plate surface 16 with the facing distance corresponding to that of the pair of flange pieces of the second flange portion 23 and which is adapted to be engaged with the pair of flange pieces of the second flange portion 23 inserted therein as shown in FIG. 3B and FIG. 5C so as to control the movement of the unit 20, which has been mounted on the upper plate surface 16, toward the front side Df in the depth direction D and in the height direction H. More specifically, as shown in FIGS. 6 and 10, the first hook portion 12 opens toward the rear side Dr in the depth direction D at a gap height allowing entry of the first flange portion 22. Similarly, the pair of second hook pieces of the second hook portion 13 open toward the rear side Dr in the depth direction D at a gap height allowing entry of the pair of flange pieces of the second flange portion 23, respectively. Furthermore, the first hook portion 12 has the chamfered portions 12c at its open end. Alternatively, the rounded portions may be formed instead of the chamfered portions. Similarly, the pair of second hook pieces of the second hook portion 13 also have the chamfered portions 13c at their respective open ends. In place of the chamfered portions, the rounded portions may be formed.

The rib portion 14 is composed of the pair of rib pieces which are formed on the upper plate surface 16 with the facing distance corresponding to the size of the unit 20 in the width direction W, that is, the distance of the both side surfaces (left and right side surfaces) 24 of the unit 20 in the width direction W, and which are adapted to be engaged with the both side surfaces 24 of the unit 20 in the width direction W, respectively, so as to control the movement of the unit 20 in the width direction W. The opposing surfaces of the pair of rib pieces of the rib portion 14 are parallel to each other.

The locking portion 32 includes a pair of locking pieces 321 which are attached to the main body (plate body) of the mounting plate 15 and which are adapted to be releasably engaged with the second flange portion 23 so as to allow movement of the unit 20 in the depth direction D during insertion and removal in the depth direction D on the upper plate surface 16, and to control movement of the unit 20, which has been mounted on the upper plate surface 16, toward the rear side Dr in the depth direction D.

The pair of locking pieces 321 of the locking portion 32 have elasticity, are mounted on the upper plate surface 16, and have a flat plate shape. The pair of locking pieces 321 of the locking portion 32 are configured to descend to a level not higher than that of the upper plate surface 16 when the locking pieces 321 are pressed by a pressing force exceeding a predetermined magnitude.

More specifically, as shown in FIGS. 6 and 10, the locking portion 32 is formed by a single leaf spring which extends in the width direction W and whose center portion in the width direction W is attached to the upper plate surface 16 by spot welding or the like. The locking portion 32 may be composed of two leaf springs of symmetrical shapes instead of the single leaf spring.

The pair of locking pieces 321 are formed by both ends of the locking portion (leaf spring) 32 in the width direction W. The upper plate surface 16 of the mounting plate 15 is provided with recesses (holes) 16s allowing the both ends of the leaf spring 32 to descend to a level not higher than that of the upper plate surface 16.

Between the two recesses 16s of the upper plate surface 16 of the mounting plate 15, two projections 16p, which may also be called half-piercings, are provided. On the other hand, at the center of the locking portion (leaf spring) 32, two holes 32s corresponding to the two projections 16p are formed. Thus, the leaf spring 32 is attached to a predetermined position of the mounting plate 15.

The leaf spring 32 also has a pair of pressed portions 32k which extend from its both ends in the width direction W toward the rear side Dr in the depth direction D and the upper side Hu in the height direction H and which receive the pressing force. The pressed portions 32k protrude toward the upper side Hu in the height direction H with a gap between their lower surfaces and the upper plate surface 16 of the mounting plate 15 that is equal to or greater than the thickness of the leaf spring 32 and is equal to or smaller than the thickness of the mounting plate 15. With this structure, the both ends of the leaf spring 32, even when descending to the level not higher than the upper plate surface 16, not excessively descend because the pair of pressed portions 32k serve as a stopper, so that the both ends do not protrude from a lower plate surface of the mounting plate 15 to the lower side Hl in the height direction H. The thickness of the second flange portion 23 is thicker than the thickness of the leaf spring 32

Next, a method of mounting the unit to the mounting plate by using this unit mounting structure will be described.

First, the unit 20 is slid from the rear side Dr in the depth direction D of the mounting plate 15 toward the front side Df in the depth direction D so that the end of the first flange portion 22 is in contact with the upper plate surface 16 in an area between the locking portion (leaf spring) 32 and the first hook portion 12.

When the pair of flange pieces of the second flange portion 23 of the unit 20, which is slid toward the front side Df in the depth direction D, come onto the pair of locking pieces 321 of the leaf spring 32 as shown in FIGS. 5A and 5B, the pair of locking pieces 321 are pressed down by the pair of flange pieces toward the lower side Hl in the height direction H to descend to the level not higher than that of the upper plate surface 16. The pair of locking pieces 321 are pressed down by the weight of the unit 20. If the unit is light in weight and cannot press down the locking pieces 321, the unit may be applied with a force from above to press down the locking pieces 321.

The unit 20 is slid toward the front side Df in the depth direction D while the both side surfaces 24 of the unit 20 in the width direction W are controlled in movement in the width direction W by the rib portion 14.

In the unit 20 further slid toward the front side Df in the depth direction D, the first flange portion 22 is inserted into the opening portion of the first hook portion 12 of the mounting plate 15, and the pair of flange pieces of the second flange portion 23 are inserted into the opening portions of the pair of second hook pieces of the second hook portion 13. Upon completion of insertion of the first flange portion 22 into the opening portion of the first hook portion 12 and insertion of the pair of flange pieces of the second flange portion 23 into the opening portions of the pair of second hook pieces of the second hook portion 13, mounting of the unit 20 on the mounting plate 15 is completed. At this time, the first flange portion 22 and the first hook portion 12 are engaged with each other, and the pair of flange pieces of the second flange portion 23 and the pair of second hook pieces of the second hook portion 13 are engaged with each other.

Further, when the mounting of the unit 20 to the mounting plate 15 is completed, that is, when the pair of flange pieces of the second flange portion 23 come to the front side Df in the depth direction D ahead of the pair of locking pieces 321 of the leaf spring 32, pressing down of the pair of locking pieces 321 by the pair of flange pieces is completed . . . The pair of locking pieces 321 of the leaf spring 32 ascend by elasticity toward the upper side Hu in the height direction H to be engaged with the end edge of the second flange portion 23 which faces the rear side Dr in the depth direction D.

As a result, as shown in FIGS. 3A and 3B, FIG. 4 and FIG. 5C the unit 20 is controlled in movement toward the front side Df in the depth direction D and movement in the height direction H by the upper plate surface 16, the first hook portion 12, and the second hook portion 13 of the mounting plate 15. Further, as shown in FIG. 3A FIG. 4 and FIG. 5A the unit 20 is controlled by the rib portion 14 in movement in the width direction W. Further, as shown in FIGS. 3A and 3B, FIG. 4 and FIG. 5C the unit 20 is controlled by the locking portion (leaf spring) 32 in movement toward the rear side Dr in the depth direction D. Thus, the unit 20 is fixed to the mounting plate 15.

Next, a method of removing the unit from the mounting plate by using this unit mounting structure will be described.

First, as shown in FIGS. 3A and 3B, FIG. 4 and FIG. 5C, the pair of pressed portions 32k of the locking portion (leaf spring) 32 of the mounting plate 15 with the unit 20 fixed thereto is pressed down by an operator toward the lower side HI in the height direction H to the level not higher than that of the upper plate surface 16. Thus, the engagement of the locking portion (leaf spring) 32 with the second flange portion 23 is released, and the unit 20 is slidable toward the rear side Dr in the depth direction D. When the unit 20 starts to be slid toward the rear side Dr in the depth direction D, the operator releases his/her hand from the locking portion 32. Thereafter, the locking portion (leaf spring) 32 is pressed down by the bottom surface 21 of the unit 20.

The unit 20 which is further slid toward the rear side Dr in the depth direction D is removed from the mounting plate 15.

According to the unit mounting structure of the second embodiment of the present invention, the unit can be attached and detached without using a screw or a tool, in the manner similar to the first embodiment. Further, the unit mounting structure can be reduced in height because nothing protrudes from the lower plate surface of the mounting plate toward the lower side in the height direction. Further, in the second embodiment, the both ends of the leaf spring can descend to the level not higher than that of the upper plate surface of the mounting plate by pressing down the pressed portions formed on the leaf spring. Therefore, pressing-down operation is easily performed when the unit is pulled out. Further, the pressed portions also serve as the stopper against pressing down over an excessive stroke, an effect of preventing plastic deformation of the leaf spring is exhibited also.

In the embodiments of the present invention described above, the electronic apparatus is exemplified by the POS terminal and the unit is exemplified by the printer unit. However, the electronic apparatus in the present invention is not limited to the POS terminal and the unit is not limited to the printer unit.

This application claims priority based on Japanese Patent Application No. 2019-021200 filed Feb. 8, 2019, the disclosure of which is incorporated herein by reference.

DESCRIPTION OF REFERENCE NUMERALS 10, 15 mounting plate
11, 16 upper plate surface 11s, 16s recess (hole)
12 first hook portion
13 second hook portion
14 rib portion
16p projection
20 unit (printer unit)
21 bottom surface
22 first flange portion
23, 23' second flange portion
24 side surface
25 lower case
26 cut-out portion
31, 32 locking portion (leaf spring)
311, 321 pair of locking pieces
32k pressed portion
32s hole

What is claimed is:

1. A unit mounting structure in which a unit is mounted to a mounting plate, the mounting plate being a plate body which has an upper plate surface extending in a depth direction and a width direction and which has a thickness along a height direction, the unit being a unit-like device extending in the width direction, the depth direction, and the height direction, the unit being mounted on the mounting plate to be removable along the depth direction on the upper plate surface, the unit after completion of mounting being fixed to the upper plate surface, wherein the unit has:
a bottom surface extending in the depth direction and the width direction;
a first flange portion extending from one side of the bottom surface, that faces a front side in the depth direction, and extending toward the front side in the depth direction; and
a second flange portion comprising a pair of flange pieces which extend from both sides of the bottom surface in the width direction, that face a rear side in the depth direction, and which extend toward outsides in the width direction, respectively, and toward the rear side in the depth direction; and wherein the mounting plate has:
a first hook portion formed on the upper plate surface and adapted to be engaged with the first flange portion inserted therein so as to control the movement of the unit, which has been mounted on the upper plate surface, toward the front side in the depth direction and in the height direction;
a second hook portion composed of a pair of second hook pieces which are formed on the upper plate surface with a facing distance corresponding to that of the pair of flange pieces of the second flange portion and which is adapted to be engaged with the pair of flange pieces of the second flange portion inserted therein so as to control the movement of the unit, which has been mounted on the upper plate surface, toward the front side in the depth direction and in the height direction; and
a locking portion including a pair of locking pieces which are attached to the plate body and which are adapted to be releasably engaged with the second flange portion so as to allow movement of the unit in the depth direction during insertion and removal in the depth direction on the upper plate surface, and to control movement of the unit, which has been mounted on the upper plate surface, toward the rear side in the depth direction, wherein the pair of locking pieces of the locking portion have elasticity, are mounted on the upper plate surface, and have a flat plate shape, the pair of locking pieces being configured to descend to a level not higher than that of the upper plate surface when the locking pieces are pressed by a pressing force exceeding a predetermined magnitude, wherein the locking portion is formed by one or two leaf springs which extend in the width direction and whose center portion in the width direction is attached to the upper plate surface, wherein the pair of locking pieces are formed by both ends of the one leaf spring in the width direction or formed by the two leaf springs, respectively, and wherein the upper plate surface is provided with a recess allowing the both ends of the leaf spring to descend to the level not higher than that of the upper plate surface.

2. The unit mounting structure according to claim 1, wherein the mounting plate further has a rib portion composed of a pair of rib pieces which are formed on the upper plate surface with a facing distance corresponding to the size of the unit in the width direction, and which are adapted to be engaged with both side surfaces of the unit in the width direction, respectively, so as to control the movement of the unit in the width direction.

3. The unit mounting structure according to claim 1, wherein:
the first hook portion opens toward the rear side in the depth direction at a gap height allowing entry of the first flange portion; and
the pair of second hook pieces of the second hook portion open toward the rear side in the depth direction at a gap height allowing entry of the pair of flange pieces of the second flange portion, respectively.

4. The unit mounting structure according to claim 3, wherein:
the first hook portion has an open end subjected to chamfering or rounding; and
the pair of second hook pieces of the second hook portion have open ends subjected to chamfering or rounding.

5. The unit mounting structure according to claim 1, wherein the both ends of the leaf spring are configured so as not to protrude from a lower plate surface of the mounting plate toward a lower side in the height direction even when the both ends descend to the level not higher than that of the upper plate surface.

6. The unit mounting structure according to claim 1, wherein the leaf spring has a pair of pressed portions which extend from the both ends toward the rear side in the depth direction and an upper side in the height direction and which receive the pressing force.

7. An electronic apparatus comprising the mounting plate, the unit, and the unit mounting structure according to claim 1, wherein the unit is a device which performs an electric operation.

8. The unit mounting structure according to claim 2, wherein:
the first hook portion opens toward the rear side in the depth direction at a gap height allowing entry of the first flange portion; and
the pair of second hook pieces of the second hook portion open toward the rear side in the depth direction at a gap height allowing entry of the pair of flange pieces of the second flange portion, respectively.

9. The unit mounting structure according to claim 8, wherein:
the first hook portion has an open end subjected to chamfering or rounding; and
the pair of second hook pieces of the second hook portion have open ends subjected to chamfering or rounding.

10. The unit mounting structure according to claim 2, wherein the both ends of the leaf spring are configured so as not to protrude from a lower plate surface of the mounting plate toward a lower side in the height direction even when the both ends descend to the level not higher than that of the upper plate surface.

11. The unit mounting structure according to claim 3, wherein the both ends of the leaf spring are configured so as not to protrude from a lower plate surface of the mounting plate toward a lower side in the height direction even when the both ends descend to the level not higher than that of the upper plate surface.

12. The unit mounting structure according to claim 4, wherein the both ends of the leaf spring are configured so as not to protrude from a lower plate surface of the mounting plate toward a lower side in the height direction even when the both ends descend to the level not higher than that of the upper plate surface.

13. The unit mounting structure according to claim 8, wherein the both ends of the leaf spring are configured so as not to protrude from a lower plate surface of the mounting plate toward a lower side in the height direction even when the both ends descend to the level not higher than that of the upper plate surface.

14. The unit mounting structure according to claim 8, wherein the both ends of the leaf spring are configured so as not to protrude from a lower plate surface of the mounting plate toward a lower side in the height direction even when the both ends descend to the level not higher than that of the upper plate surface.

15. An electronic apparatus comprising the mounting plate, the unit, and the unit mounting structure according to claim 2, wherein the unit is a device which performs an electric operation.

16. An electronic apparatus comprising the mounting plate, the unit, and the unit mounting structure according to claim 3, wherein the unit is a device which performs an electric operation.

17. An electronic apparatus comprising the mounting plate, the unit, and the unit mounting structure according to claim 4, wherein the unit is a device which performs an electric operation.

18. An electronic apparatus comprising the mounting plate, the unit, and the unit mounting structure according to claim 5, wherein the unit is a device which performs an electric operation.

19. An electronic apparatus comprising the mounting plate, the unit, and the unit mounting structure according to claim 8, wherein the unit is a device which performs an electric operation.

20. An electronic apparatus comprising the mounting plate, the unit, and the unit mounting structure according to claim 9, wherein the unit is a device which performs an electric operation.

* * * * *